United States Patent
Takahashi

(10) Patent No.: US 6,295,458 B1
(45) Date of Patent: Sep. 25, 2001

(54) DEVICE FOR AUTOMATICALLY GENERATING AN ADDRESSEE NUMBER TO WHICH A SHORT MESSAGE IS TO BE TRANSMITTED

(75) Inventor: Hiroyuki Takahashi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/323,268

(22) Filed: Jun. 1, 1999

(30) Foreign Application Priority Data

May 29, 1998 (JP) .................................................. 10-148794

(51) Int. Cl.$^7$ ...................................................... H04Q 1/00
(52) U.S. Cl. ........................... 455/466; 455/556; 455/575
(58) Field of Search ..................................... 455/466, 414, 455/556, 95, 575; 379/266, 355, 356, 357

(56) References Cited

U.S. PATENT DOCUMENTS

| | | | |
|---|---|---|---|
| 5,292,004 | * 3/1994 | Cesarini | 209/3.1 |
| 5,357,245 | * 10/1994 | Hagiwara | 340/825.34 |
| 5,694,457 | * 12/1997 | Nixon et al. | 379/100 |
| 5,877,746 | * 3/1999 | Parks et al. | 345/156 |
| 5,917,904 | * 6/1999 | Theis | 379/355 |
| 6,047,053 | * 4/2000 | Miner et al. | 379/201 |

FOREIGN PATENT DOCUMENTS 5-37457 A    2/1993   (JP) .

* cited by examiner

Primary Examiner—Daniel Hunter
Assistant Examiner—Thuan T. Nguyen
(74) Attorney, Agent, or Firm—Nixon & Vanderhye, P.C.

(57) ABSTRACT

In a device for automatically generating an addressee number to which a short message is to be transmitted, the name of the country of the user previously stored in a user country name memory 19 is read out by a country name reader 23, and the telephone number of the addressee previously stored in an addressee telephone number memory 18 is read out by a telephone number reader 24. When the telephone number of the addressee is found to be a telephone number for a domestic call, an addressee number generator 25 adds the country code of the user's country to the telephone number of the addressee and thereby automatically generates the addressee number to which the short message is to be transmitted.

9 Claims, 8 Drawing Sheets

DEVICE FOR AUTOMATICALLY GENERATING AN ADDRESSEE NUMBER TO WHICH A SHORT MESSAGE IS TO BE TRANSMITTED

BACKGROUND OF THE INVENTION

1. Field of the Invention

The present invention relates to a mobile wireless communications terminal, and particularly to a device for automatically generating an addressee number to which a short message is to be transmitted.

2. Description of the Prior Art

A mobile wireless communications terminal, such as a portable telephone, is provided with a function that allows transmission of a short message, which is a piece of character-based information. In general, when a short message is transmitted, in contrast to cases where an ordinary telephone call is originated, it is necessary to dial a country code (i.e. an international telephone code) before dialing the telephone number of the addressee to whom the short message is going, to be transmitted even for a domestic call. Thus, in a situation where short messages are transmitted frequently, entering the numbers of addressees takes too much time and trouble.

A conventional portable telephone has a function, such as an abbreviated dialing or one-touch dialing function, that allows one of previously stored numbers to be called up instantly by predetermined operation of keys. This makes it easy to originate a call to an addressee to whom calls are made frequently. However, to use an abbreviated dialing, one-touch dialing, or similar function, it is necessary to previously enter and register, in addition to the ordinary telephone numbers of addressees, also the numbers to which a short message is to be transmitted. Thus, registering the numbers of addressees takes extra time and trouble.

SUMMARY OF THE INVENTION

An object of the present invention is to provide a device that automatically generates an addressee number to which a short message is to be transmitted and that thereby simplifies the operation required to be performed to enter the addressee number.

To achieve the above object, according to one aspect of the present invention, a device for automatically generating an addressee number to which a short message is to be transmitted is provided with:

- a first memory for storing the name of the country of the user;
- a second memory for storing the telephone number of the addressee;
- a third memory for storing a country code;
- a reader for reading out data from the first and second memories;
- a short message addressee number generator that, when the telephone number read out from the second memory is a telephone number for a domestic call, adds the country code to the telephone number to generate the addressee number to which the short message is to be transmitted, the short message addressee number generator extracting the country code from the third memory in accordance with the name of the country read out from the first memory.

According to another aspect of the present invention, a device for automatically generating an addressee number to which a short message is to be transmitted, is provided with:

- a first memory for storing the name of the country of the addressee;
- a second memory for storing the telephone number of the addressee;
- a third memory for storing a country code;
- a reader for reading out data from the first and second memories;
- a short message addressee number generator that adds the country code to the telephone number read out from the second memory to generate the addressee number to which the short message is to be transmitted, the short message addressee number generator extracting the country code from the third memory in accordance with the name of the country read out from the first memory.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
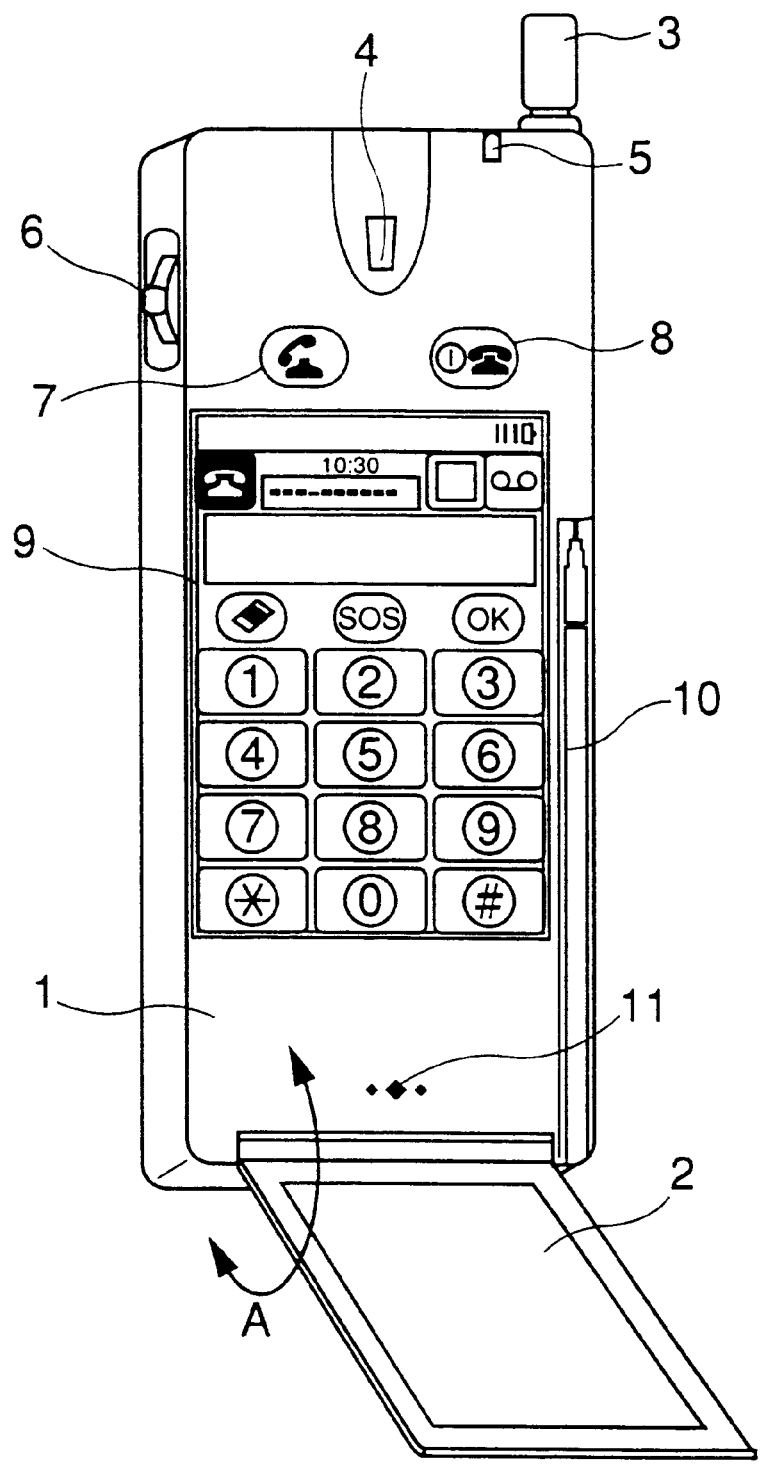
FIG. 1 is a diagram showing the appearance of a portable telephone embodying the invention.

Hereinafter, embodiments of the present invention will be described in detail with reference to the accompanying drawings. FIG. 1 is a diagram showing the appearance of a portable telephone embodying the invention. The portable telephone is composed of a body cabinet 1 and a flap 2.

The body cabinet 1 includes a data entry/display unit 9 on which various items of data are displayed to allow selection among them and other operations, a pen 10 with which to perform data entry operation on the data entry/display unit 9, an antenna 3 by way of which a radio wave is received and transmitted, an earpiece unit 4 such as a loudspeaker, a mouthpiece unit 11 such as a microphone, an LED (light-emitting diode) 5 that indicates battery-charge and other states, a multiple-function push switch 6, and a plurality of independent keys 7 and 8.

The flap 2 is fitted to the bottom surface of the body cabinet 1 with a hinge so as to be rotatable in the directions indicated by the arrows A. The flap 2 can be so rotated as to cover the data entry/display unit 9, and this makes it possible to protect the data entry/display unit 9 when the portable telephone is brought around. The body cabinet 1 further includes a body switch (not shown) that is operated to turn on or off the supply of electric power within the body.

Figure 2:
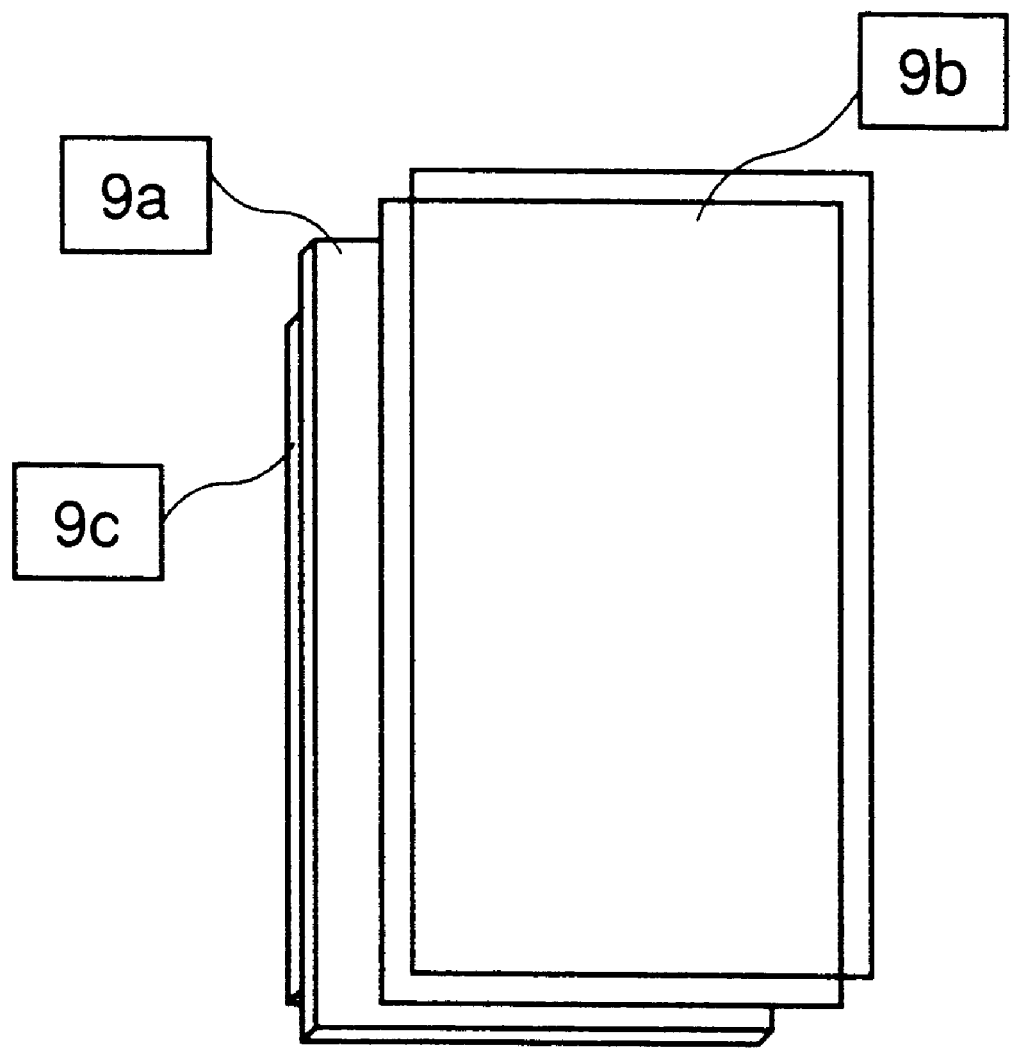
FIG. 2 is a diagram showing a disassembled state of the data entry/display unit of the portable telephone of the embodiment.

FIG. 2 is a diagram showing a disassembled state of the data entry/display unit 9. The data entry/display unit 9 is composed of the following two components integrated together: a thin screen display unit 9a of a matrix type that allows display of characters, and a transparent tablet 9b so large as to cover the screen display unit 9a. As required, the screen display unit 9a may be, over its back surface, fitted with a backlight unit 9c such as an EL (electroluminescent) panel.

The transparent tablet 9b has two transparent electrodes (not shown) arranged between two transparent sheets. In normal condition, small projection-like spacers that are printed at regular intervals between the two transparent sheets keep the two transparent electrodes out of contact with each other. When the transparent tablet 9b is pressed with a finger or with the pen 10, the two transparent electrodes are brought into contact with each other, and the spot at which the transparent tablet 9b is pressed is recognized. At this time, in accordance with the spot at which the transparent tablet 9b is pressed, the corresponding one of the data items displayed on the screen display unit 9a is selected.

Figure 6:
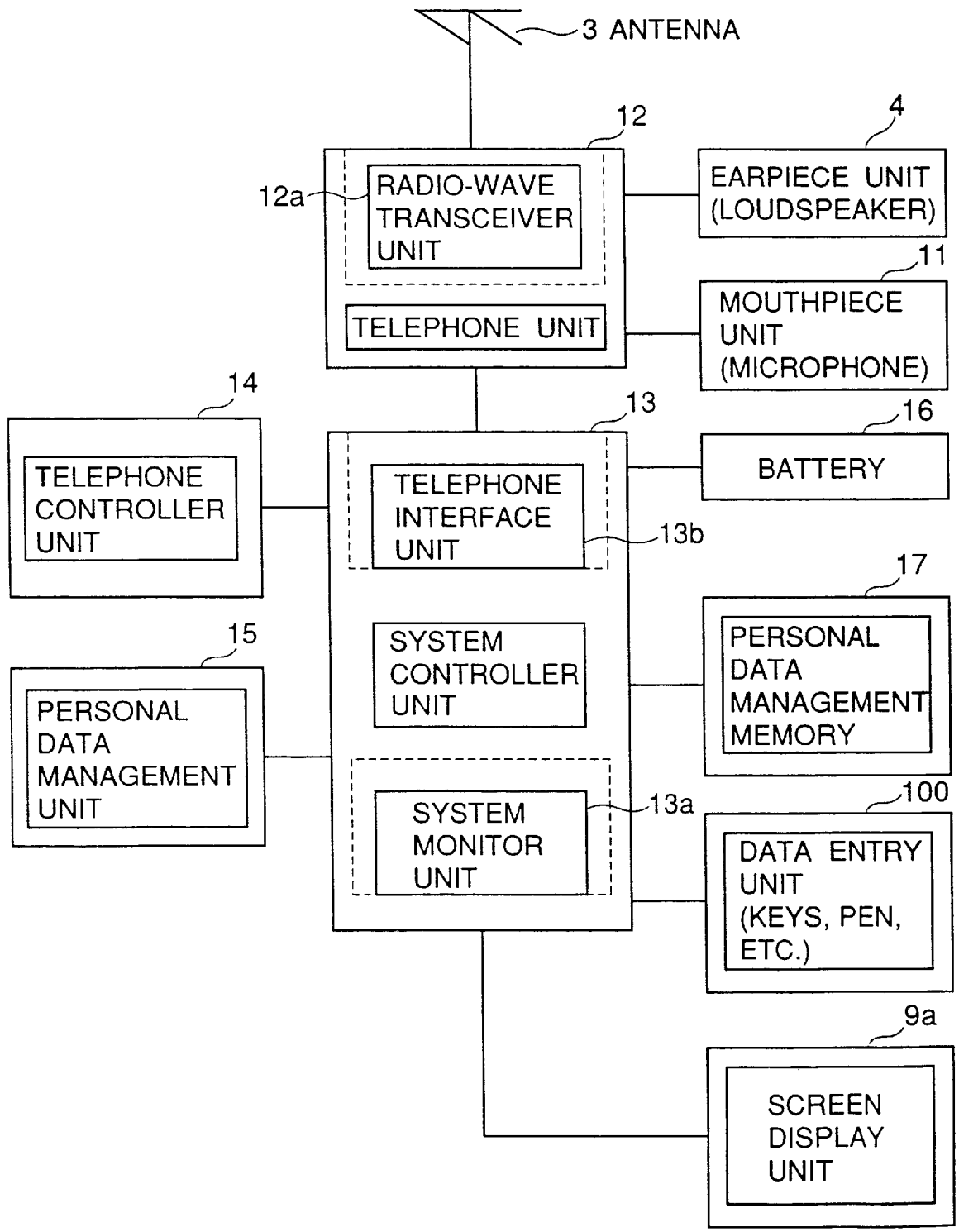
FIG. 6 is a system configuration diagram of the portable telephone of the embodiment.

FIG. 6 is a block diagram showing the system configuration of the portable telephone. The operation of the portable telephone is controlled by a system controller unit 13. The system controller unit 13 includes a telephone interface as unit 13b and a system monitor unit 13a for monitoring the status of the system. Through the telephone interface unit 13b, the system controller unit 13 is connected to a telephone unit 12 for achieving telephone functions and to a telephone controller unit 14 for controlling telephone functions. The telephone unit 12 includes a radio-wave transceiver (transmitter/receiver) unit 12a, and is connected to the antenna 3. The telephone unit 12 is connected also to the earpiece unit 4 and to the mouthpiece unit 11.

The system controller unit 13 is connected also to a personal data management memory 17, which is a non-volatile memory for storing personal information such as telephone numbers and is controlled by a personal data management unit 15. The system is fed with electric power from a battery 16, which is connected to and controlled by the system controller unit 13. The keys displayed on the screen display unit 9a of the data entry/display unit 9, the pen 10, the multiple-function push switch 6, and the independent keys 7 and 8 constitute a data entry unit 100, which is also connected to and controlled by the system controller unit 13.

Figure 7:
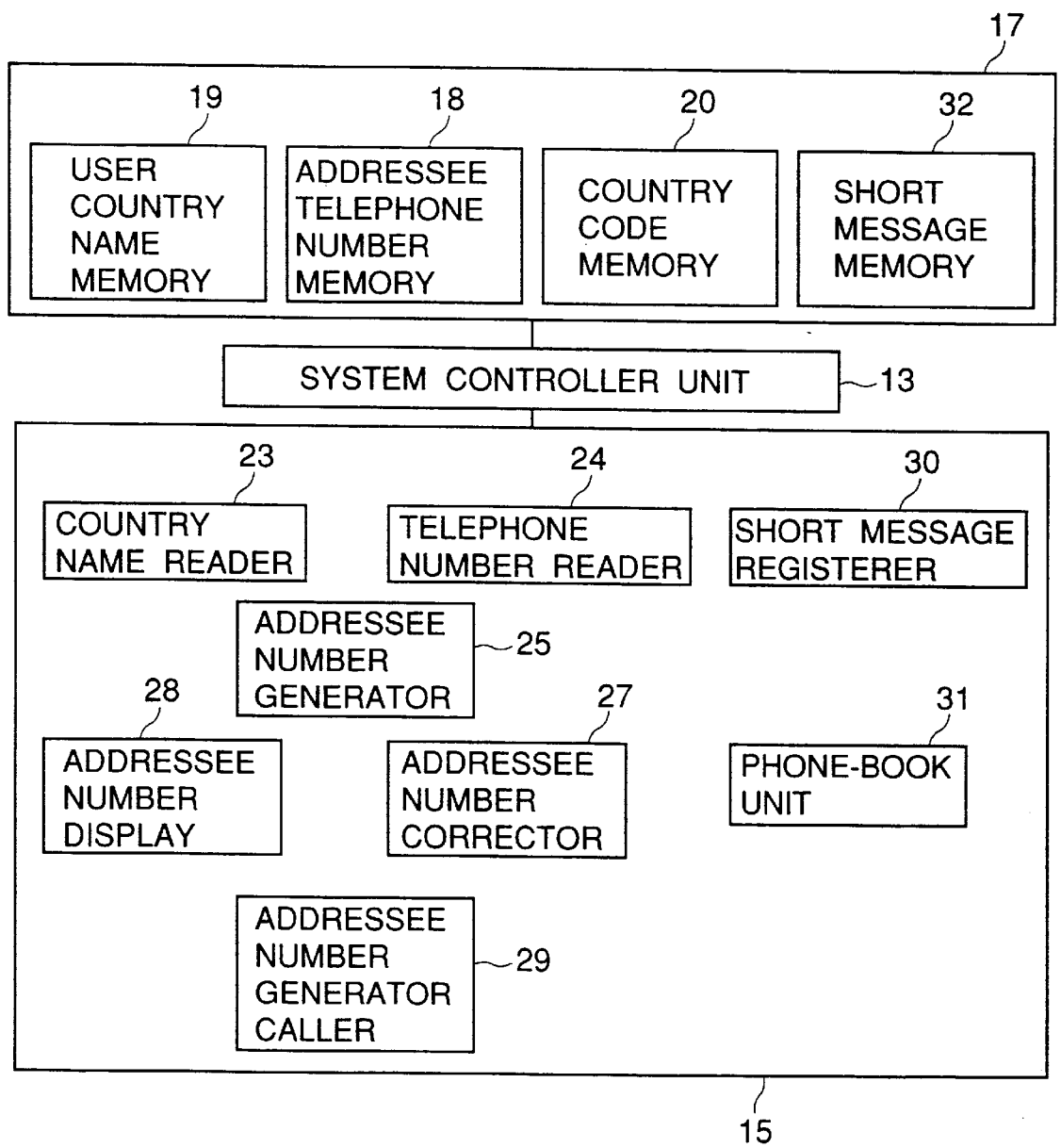
FIG. 7 is a block diagram of the portable telephone of the embodiment.

FIG. 7 is a block diagram showing in more detail the configuration of the personal data management unit 15 and the personal data management memory 17. The personal data management memory 17 includes an addressee telephone number memory 18 for storing the telephone numbers of addressees, a user country name memory 19 for storing the name of the country to which the user of the portable telephone belongs, a country code memory 20 in which a table of country names and corresponding country codes is stored previously, and a short message memory 32 for storing the text of a short message and the number of an addressee.

The personal data management unit 15 controls the user country name memory 19, the addressee telephone number memory 18, the country code memory 20, and the short message memory 32 through the system controller unit 13.

The personal data management unit 15 includes a country name reader 23 for reading out the name of the country of the user stored in the user country name memory 19, and a telephone number reader 24 for reading out the telephone number of an addressee stored in the addressee telephone number memory 18. The personal data management unit 15 further includes an addressee number generator 25 that, in accordance with the country name read out by the country name reader 23, extracts a country code from the country code memory 20 and adds the country code to the telephone number of the addressee read out by the telephone number reader 24 to generate an addressee number to which a short message is going to be transmitted.

The personal data management unit 15 further includes a short message registerer 30 that registers in the short message memory 32 the addressee number generated by the addressee number generator 25 and the short message, an addressee number display 28 that displays the addressee number on the screen, an addressee number corrector 27 that allows the addressee number displayed by the addressee number display 28 to be corrected from the data entry unit 18, an addressee number generator caller 29 that calls up the addressee number generator 25, and a phone-book unit 31 that retrieves a telephone number in accordance with the name of the addressee selected by the user.

The portable telephone of the embodiment is configured as described above. Now, the operation of this portable telephone will be described with reference to the flow charts shown in FIGS. 8, 9, and 10. In advance, the user of the portable telephone, by operating the tablet 9b, enters the name of the country of the user to register it in the user country name memory 19. In the example described below, the user country name is assumed to be registered as "Japan". Moreover, in advance, the user registers one or more telephone numbers in the addressee telephone number memory 18.

Figure 3:
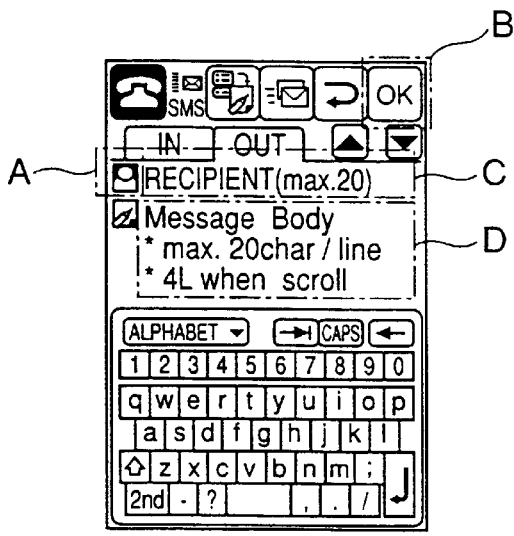
FIG. 3 is a diagram showing a screen displayed when a short message is entered in the portable telephone of the embodiment.
Figure 10:
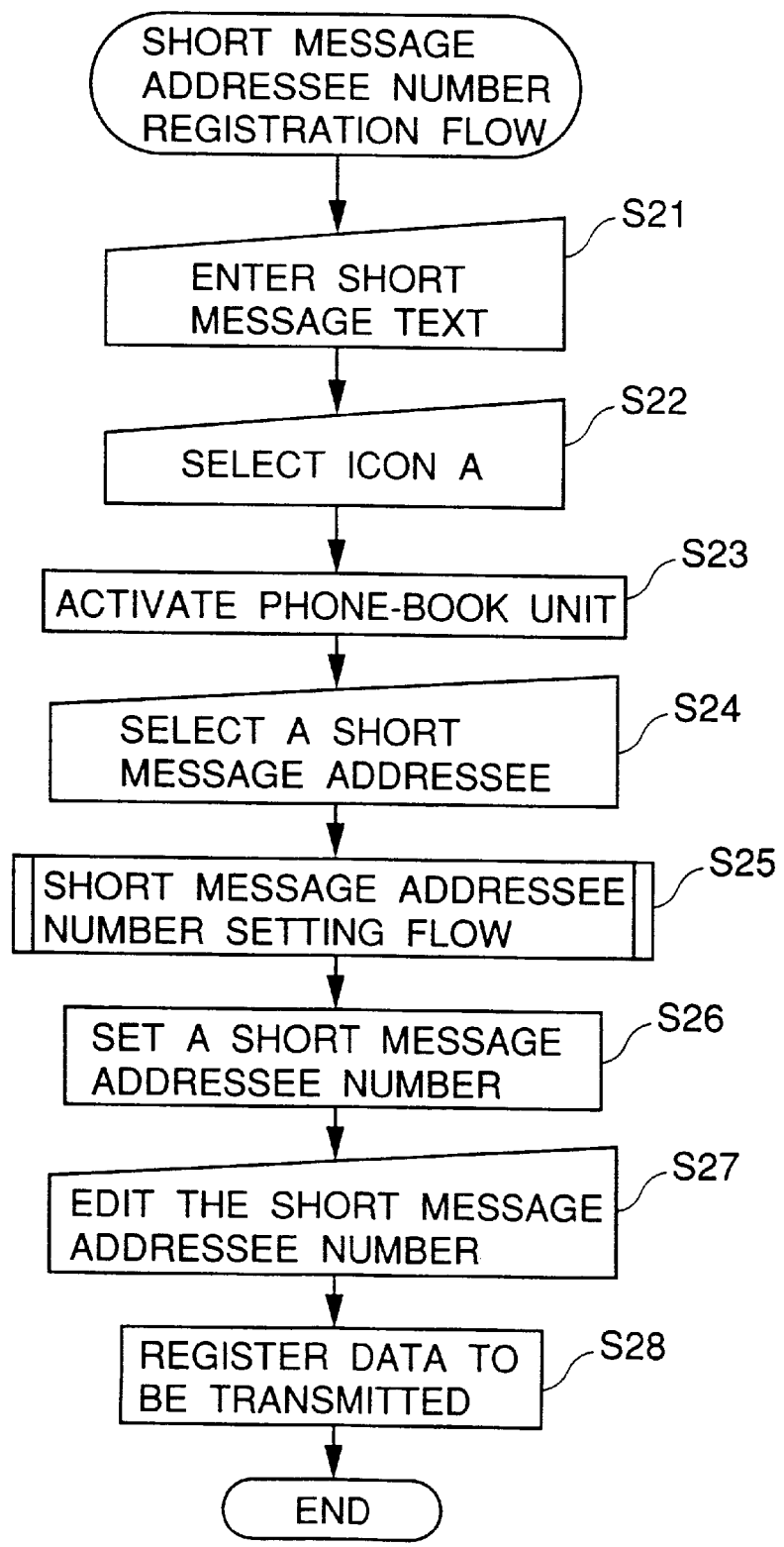
FIG. 10 is a flow chart showing the flow of operations performed when a short message transmission addressee number is registered in the portable telephone of the embodiment

In step S21 shown in FIG. 10, the text of a short message to be transmitted is entered. As shown in FIG. 3, this text is displayed in the area D on the data entry/display unit 9. Here, when the number of an addressee is entered in the area C, and then the OK key B is pressed, the text of the short message to be transmitted is registered in the short message memory 32.

In step S22, when the icon A (see FIG. 3) is pressed to call up the addressee number to which the short message is to be transmitted, then, in step S23, the phone-book unit 31 is activated. At this time, a list of addressees for short message transmission as shown in FIG. 4 is displayed on the data entry/display unit 9.

Figure 4:
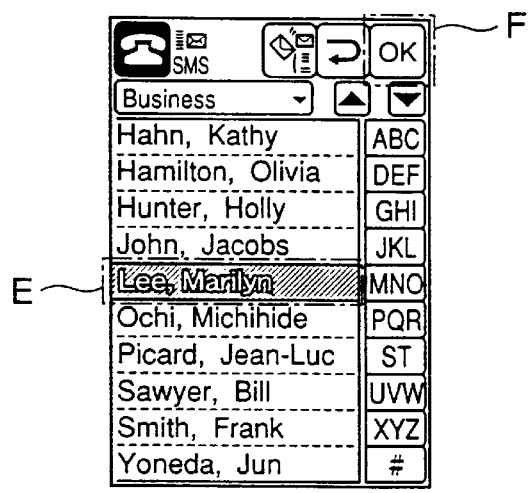
FIG. 4 is a diagram showing a screen displayed when an addressee to whom a short message is transmitted is selected in the portable telephone of the embodiment.
Figure 5:
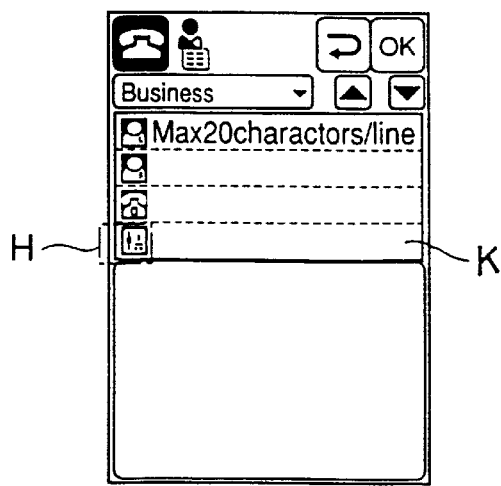
FIG. 5 is a diagram showing a phone-book screen of the portable telephone of the embodiment.

In step S24, the user selects the desired addressee (the record E shown in FIG. 4). When the OK key F is pressed, then, in step S25, the flow of operations shown in FIG. 9 for setting the short message transmission addressee number is called up. This flow of operations for setting the short message transmission addressee number is performed by the addressee number generator caller 29. At this time, a screen as shown in FIG. 5 is displayed on the data entry/display unit 9.

Figure 9:
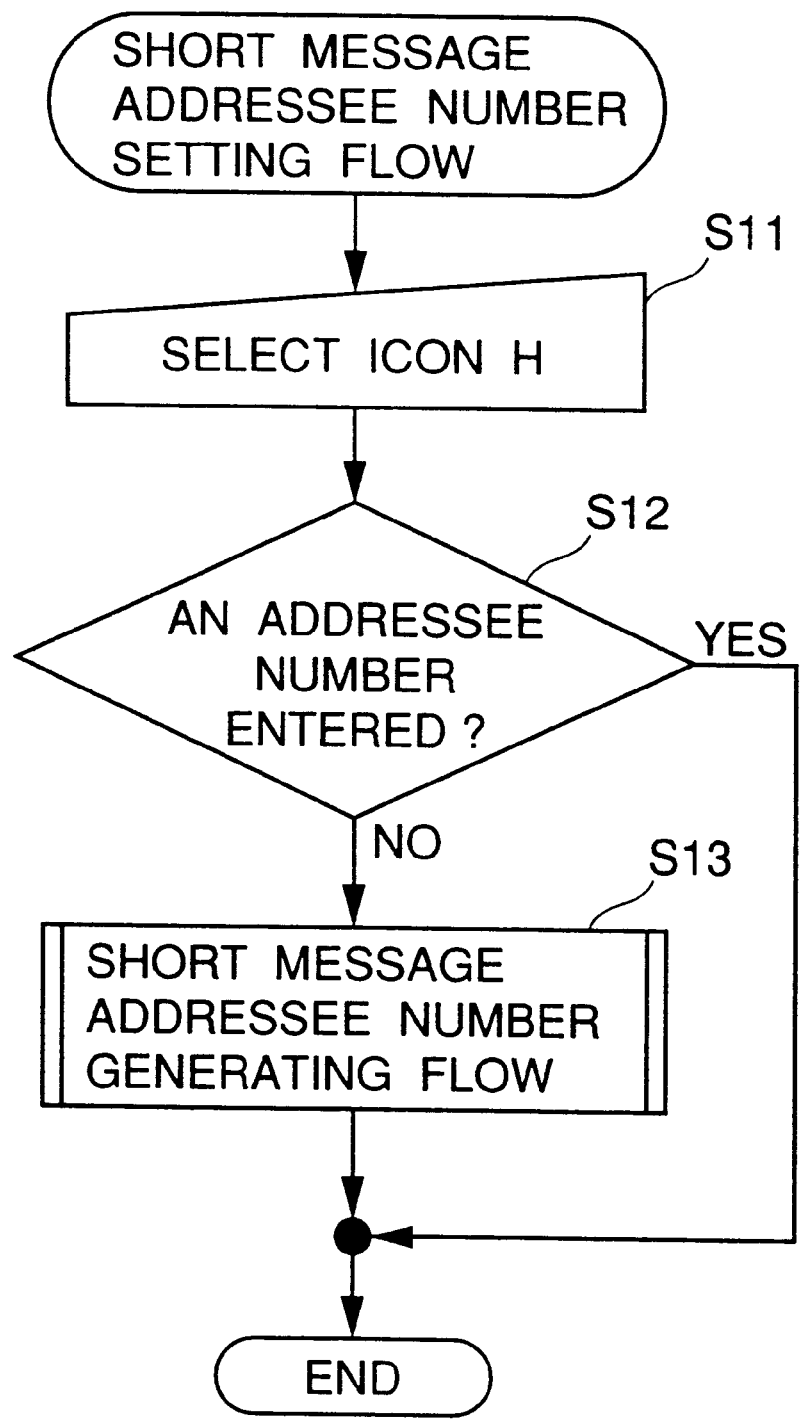
FIG. 9 is a flow chart showing the flow of operations performed when a short message transmission addressee number is set in the portable telephone of the embodiment.

In step S11 shown in FIG. 9, the user selects the icon H to set the addressee number to which the short message is to be transmitted. Alternatively, it is also possible to skip to step S12 immediately when the OK key F shown in FIG. 4 is pressed.

In step S12, whether an addressee number has already been entered or not is checked. If an addressee number has already been entered, execution of this flow of operations is finished, and the flow of operations shown in FIG. 10 starts being executed from step S26. If no addressee number has been entered yet, then, in step S13, the flow of operations shown in FIG. 8 for generating the short message transmission addressee number is called up. The flow of operations for generating the short message transmission addressee number is performed by the addressee number generator 25.

Figure 8:
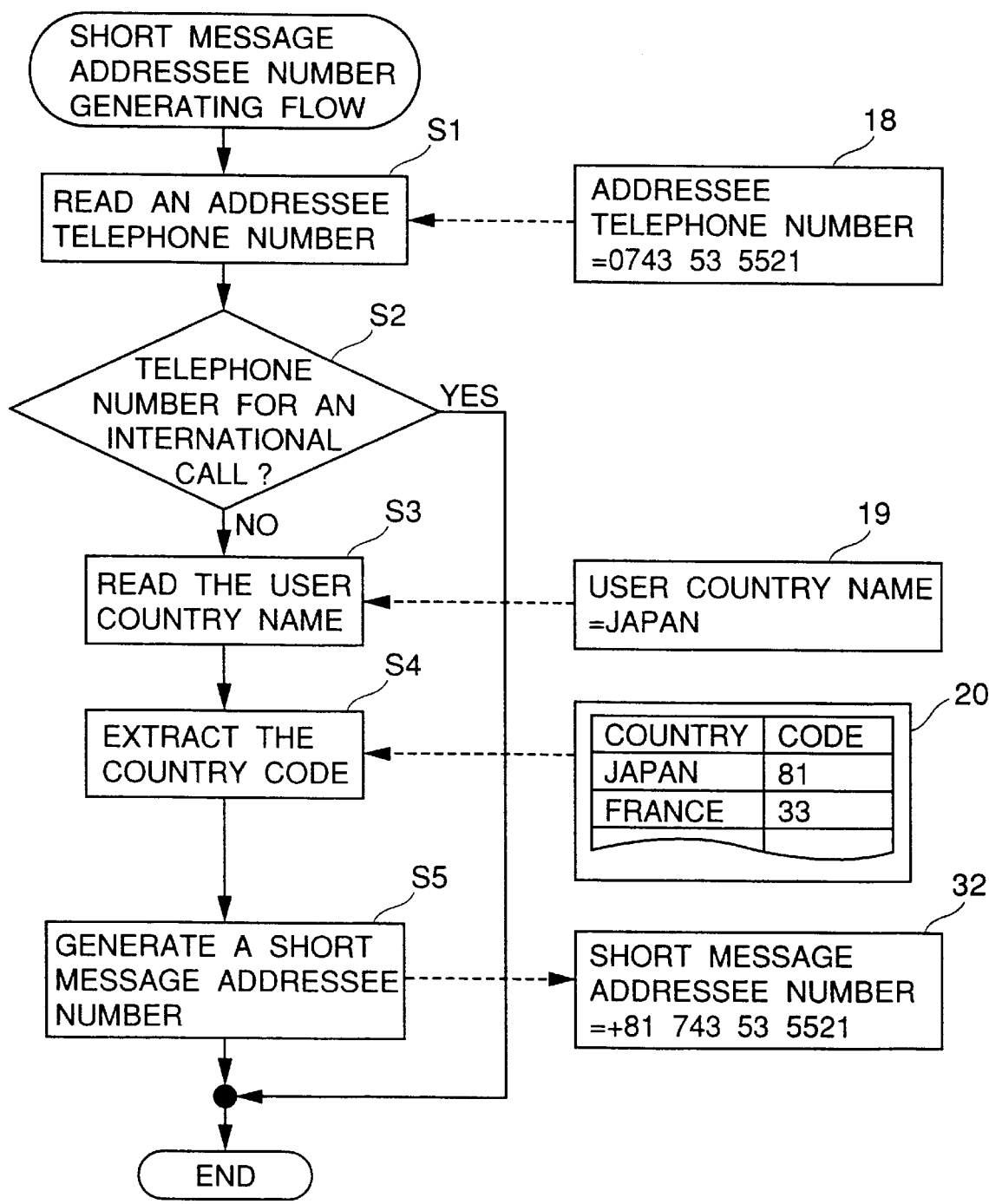
FIG. 8 is a flow chart showing the flow of operations performed when a short message transmission addressee number is generated in the portable telephone of the embodiment.

In step S1 shown in FIG. 8, the telephone number reader 24 reads out the telephone number of the addressee from the addressee telephone number memory 18. In the example being described, the telephone number that is read out is assumed to be "0743 53 5521". Next, in step S2, whether the telephone number thus read out is a telephone number for a domestic call or not is checked. In the example, the telephone number of the addressee does not start with "+", and is thus recognized as a telephone number for a domestic call. If the telephone number starts with "+", execution of this flow of operations is finished, and the flow of operations shown in FIG. 10 starts being executed from step S26.

Then, in step S3, the country name reader 23 reads out the name of the country of the user from the user country name memory 19. In the example, the user country name that is read out is assumed to be "Japan". In step S4, in accordance with the user country name thus read out, the country code corresponding thereto is extracted from the table stored in the country code memory 20. In the example, the country code that is extracted is assumed to be "81".

In step S5, a "+" is added at the head of the country code corresponding to the user country name, and, to the end thereof, the number obtained by removing the first "0" from the telephone number of the addressee is appended. In the example, the number thus generated is "+81 743 53 5521". This number is, as the addressee number to which the short message is going to be transmitted, stored in the short message memory 32.

Back in FIG. 10, in step S26, the short message transmission addressee number generated in step S25 is displayed, for registration, in the area K (see FIG. 5) on the data entry/display unit 9. As required, in step S27, the thus displayed addressee number can be edited by the user by the use of the addressee number corrector 27. In step S28, data consisting of the short message entered in the area D (see FIG. 3) and the addressee number displayed in the area K is registered in the short message memory 32 by the short message registerer 30.

The flows of operations described above make it possible to generate automatically an addressee number to which a short message is to be transmitted, and thereby make it unnecessary, as long as the user country name and the telephone number of an addressee are stored previously, to enter an addressee number separately from the ordinary telephone number every time a short message is transmitted.

In the embodiment described above, the user country name memory 19 is used to store the name of the country of the user. Accordingly, for an addressee who belongs to a country different from the users, a telephone number having a country code added thereto is stored in the addressee telephone number memory 18. Thus, a telephone number having no country code added thereto is recognized as belonging to the same country as the user's, and therefore an addressee number to which a short message is to be transmitted is generated in Step S5 (see FIG. 8).

As another embodiment, it is also possible to provide, instead of the user country name memory 19, an addressee country name memory for storing the names of the countries of addressees so that an addressee number to which a short message is to be transmitted is generated by adding a country code extracted in accordance with the name of the country of an addressee to the telephone number of the addressee. In this case, the telephone numbers stored in the addressee telephone number memory 18 do not need to include the country codes of addressees. Accordingly, it is not necessary to check whether the telephone number in question is a telephone number for a domestic call or not in step S2 (see FIG. 8).

In the embodiments described above, when the user presses the icon H (see FIG. 5), an addressee number to which a short message is to be transmitted is generated by the addressee number generator 25. Alternatively, a short message transmission addressee number may be generated and registered automatically by the addressee number generator 25 when the telephone number of an addressee is registered in the addressee telephone number memory 18 by means of the phone-book unit 31. Alternatively, a short message transmission addressee number may be generated automatically by the addressee number generator 25 when a short message is entered so as to be registered in the short message memory 32.

It is to be understood that the present invention is applicable not only to portable telephones but also to any other mobile wireless communications terminals.

What is claimed is:

1. A device for automatically generating an addressee number to which a short message is to be transmitted, comprising:

a first memory for storing a name of a country of a user;

a second memory for storing a telephone number of an addressee;

a third memory for storing a country code;

a reader for reading out data from the first and second memories;

a short message addressee number generator that, when the telephone number read out from the second memory is a telephone number for a domestic call, adds the country code to the telephone number to generate the addressee number to which the short message is to be transmitted, the short message addressee number generator extracting the country code from the third memory in accordance with the name of the country read out from the first memory.

2. A device for automatically generating an addressee number to which a short message is to be transmitted as claimed in claim 1, wherein the addressee number is generated in response to a predetermined entry operation by the user.

3. A device for automatically generating an addressee number to which a short message is to be transmitted as claimed in claim 1, wherein the addressee number is generated on completion of entry of a text of the short message.

4. A device for automatically generating an addressee number to which a short message is to be transmitted as claimed in claim 1, wherein the addressee number is generated on completion of registration of the telephone number of the addressee in the second memory.

5. A device for automatically generating an addressee number to which a short message is to be transmitted, comprising:

a first memory for storing a name of a country of an addressee;

a second memory for storing a telephone number of the addressee;

a third memory for storing a country code;

a reader for reading out data from the first and second memories;

a short message addressee number generator that adds the country code to the telephone number read out from the second memory to generate the addressee number to which the short message is to be transmitted, the short message addressee number generator extracting the country code from the third memory in accordance with the name of the country read out from the first memory.

6. A device for automatically generating an addressee number to which a short message is to be transmitted as claimed in claim 5, wherein the short message addressee number generator generates the addressee number when the telephone number read out from the second memory is a telephone number for a domestic call.

7. A device for automatically generating an addressee number to which a short message is to be transmitted as claimed in claim 5, wherein the addressee number is generated in response to a predetermined entry operation by the user.

8. A device for automatically generating an addressee number to which a short message is to be transmitted as claimed in claim 5, wherein the addressee number is generated on completion of entry of a text of the short message.

9. A device for automatically generating an addressee number to which a short message is to be transmitted as claimed in claim 5, wherein the addressee number is generated on completion of registration of the name of the country of the addressee in the first memory and registration of the telephone number of the addressee in the second memory.

* * * * *